(12) United States Patent
Kroizer et al.

(10) Patent No.: US 8,544,272 B2
(45) Date of Patent: Oct. 1, 2013

(54) SOLAR RECEIVER

(75) Inventors: Israel Kroizer, Jerusalem (IL); Gabriel Kaufmann, Beit Hananya (IL); Leon Afremov, Yehud (IL); Yoel Gilon, Jerusalem (IL)

(73) Assignee: Brightsource Industries (Israel) Ltd., Jerusalem (IL)

( * ) Notice: Subject to any disclaimer, the term of this patent is extended or adjusted under 35 U.S.C. 154(b) by 732 days.

(21) Appl. No.: 12/664,038

(22) PCT Filed: Jun. 11, 2008

(86) PCT No.: PCT/US2008/066597
§ 371 (c)(1),
(2), (4) Date: Jun. 1, 2010

(87) PCT Pub. No.: WO2008/154599
PCT Pub. Date: Dec. 18, 2008

(65) Prior Publication Data
US 2010/0236239 A1    Sep. 23, 2010

Related U.S. Application Data

(60) Provisional application No. 60/943,096, filed on Jun. 11, 2007.

(51) Int. Cl.
*F03G 6/06* (2006.01)
*F01K 7/34* (2006.01)

(52) U.S. Cl.
USPC ............................................ 60/641.8; 60/653

(58) Field of Classification Search
USPC ................................................ 60/641.8, 653
See application file for complete search history.

(56) References Cited

U.S. PATENT DOCUMENTS 811,274 A    1/1906   Carter
2,999,943 A  9/1961   Willard
(Continued)

FOREIGN PATENT DOCUMENTS

EP    0106688      3/1985
JP    56-102646    8/1981
(Continued)

OTHER PUBLICATIONS

"Mean and Peak Wind Load Reduction on Heliostats," Colorado State University, Solar Energy Research Institute, U.S. Department of Energy [online], Sep. 1987 [retrieved on May 16, 2012]. Retrieved from the Internet: <URL: http://www.nrel.gov/docs/legosti/old/3212.pdf>.

(Continued)

*Primary Examiner* — Kenneth Bomberg
*Assistant Examiner* — Shafiq Mian
(74) *Attorney, Agent, or Firm* — Miles & Stockbridge P.C.; Mark A. Catan (57) ABSTRACT

A method for generating steam for a turbine electric power plant uses solar radiation. Solar radiation is directed onto a solar receiver. The solar receiver includes a first section, which receives feedwater input and is arranged to heat the feedwater input to generate steam using the directed solar radiation. Feedwater flows through a feedwater vessel to serve as feedwater input to an inlet of the first section of the receiver. Water is separated from the steam in steam separation vessel, which is in fluid communication with an outlet of the first section of the receiver. The feedwater input may be selectively preheated by a source of preheat other than solar energy in response to system operating conditions, predicted insolation schedule, or an electrical energy tariff schedule.

9 Claims, 9 Drawing Sheets

(56) References Cited

U.S. PATENT DOCUMENTS

| | | | |
|---|---|---|---|
| 3,696,286 A * | 10/1972 | Ule | 320/101 |
| 3,892,433 A * | 7/1975 | Blake | 290/52 |
| 3,924,604 A | 12/1975 | Anderson | |
| 4,034,735 A | 7/1977 | Waldrip | |
| 4,044,753 A | 8/1977 | Fletcher et al. | |
| 4,102,326 A | 7/1978 | Sommer | |
| 4,117,682 A | 10/1978 | Smith | |
| 4,146,785 A | 3/1979 | Neale | |
| 4,172,443 A | 10/1979 | Sommer | |
| 4,219,729 A | 8/1980 | Smith | |
| 4,227,513 A | 10/1980 | Blake et al. | |
| 4,245,618 A | 1/1981 | Wiener | |
| 4,247,182 A | 1/1981 | Smith | |
| 4,257,397 A * | 3/1981 | Gouyou-Beauchamps | 126/587 |
| 4,265,223 A * | 5/1981 | Miserlis et al. | 126/592 |
| 4,283,887 A | 8/1981 | Horton et al. | |
| 4,289,114 A | 9/1981 | Zadiraka | |
| 4,297,521 A | 10/1981 | Johnson | |
| 4,331,829 A | 5/1982 | Palazzetti et al. | |
| 4,343,182 A | 8/1982 | Pompei | |
| 4,365,618 A | 12/1982 | Jones | |
| 4,400,946 A * | 8/1983 | Oplatka | 60/641.8 |
| 4,438,630 A | 3/1984 | Rowe | |
| 4,459,972 A | 7/1984 | Moore | |
| 4,474,169 A | 10/1984 | Steutermann | |
| 4,485,803 A | 12/1984 | Wiener | |
| 4,490,981 A | 1/1985 | Meckler | |
| 4,512,336 A | 4/1985 | Wiener | |
| 4,564,275 A | 1/1986 | Stone | |
| 4,633,854 A | 1/1987 | Mayrhofer | |
| 4,825,654 A * | 5/1989 | Svoboda | 60/665 |
| 4,913,129 A | 4/1990 | Kelly et al. | |
| 5,128,799 A | 7/1992 | Byker | |
| 5,417,052 A | 5/1995 | Bharathan et al. | |
| 5,578,140 A | 11/1996 | Yogev et al. | |
| 5,759,251 A | 6/1998 | Nakamura et al. | |
| 5,861,947 A | 1/1999 | Neumann | |
| 5,862,799 A | 1/1999 | Yogev et al. | |
| 5,899,199 A | 5/1999 | Mills | |
| 5,905,590 A | 5/1999 | Van Der Sluis et al. | |
| 5,982,481 A | 11/1999 | Stone et al. | |
| 6,080,927 A | 6/2000 | Johnson | |
| 6,131,565 A | 10/2000 | Mills | |
| 6,310,725 B1 | 10/2001 | Duine et al. | |
| 6,597,709 B1 | 7/2003 | Diver, Jr. | |
| 6,653,551 B2 | 11/2003 | Chen | |
| 6,662,801 B2 | 12/2003 | Hayden et al. | |
| 6,818,818 B2 | 11/2004 | Bareis | |
| 6,899,097 B1 | 5/2005 | Mecham | |
| 6,926,440 B2 | 8/2005 | Litwin | |
| 6,957,536 B2 | 10/2005 | Litwin et al. | |
| 6,959,993 B2 | 11/2005 | Gross et al. | |
| 7,042,615 B2 | 5/2006 | Richardson | |
| 7,055,519 B2 * | 6/2006 | Litwin | 126/683 |
| 7,191,597 B2 | 3/2007 | Goldman | |
| 7,191,736 B2 | 3/2007 | Goldman | |
| 7,207,327 B2 | 4/2007 | Litwin et al. | |
| 7,296,410 B2 | 11/2007 | Litwin | |
| 7,331,178 B2 | 2/2008 | Goldman | |
| 7,340,899 B1 | 3/2008 | Rubak et al. | |
| 7,523,921 B2 | 4/2009 | Garrity | |
| 7,884,279 B2 | 2/2011 | Dold et al. | |
| 8,001,960 B2 | 8/2011 | Gilon et al. | |
| 8,033,110 B2 | 10/2011 | Gilon et al. | |
| 2004/0086021 A1 | 5/2004 | Litwin | |
| 2004/0231716 A1 | 11/2004 | Litwin | |
| 2005/0126170 A1 | 6/2005 | Litwin | |
| 2006/0042624 A1 * | 3/2006 | Zhang | 126/577 |
| 2007/0084208 A1 | 4/2007 | Goldman | |
| 2007/0157614 A1 | 7/2007 | Goldman | |
| 2007/0157922 A1 | 7/2007 | Radhakrishnan et al. | |
| 2007/0221208 A1 | 9/2007 | Goldman | |
| 2007/0272234 A1 | 11/2007 | Allen et al. | |
| 2008/0000436 A1 | 1/2008 | Goldman | |
| 2008/0011288 A1 | 1/2008 | Olsson | |
| 2008/0011290 A1 | 1/2008 | Goldman et al. | |
| 2008/0293132 A1 | 11/2008 | Goldman et al. | |
| 2008/0295883 A1 | 12/2008 | Ducellier et al. | |
| 2008/0314438 A1 | 12/2008 | Tran et al. | |
| 2009/0038608 A1 | 2/2009 | Caldwell | |
| 2009/0056701 A1 | 3/2009 | Mills et al. | |
| 2009/0107485 A1 | 4/2009 | Reznik et al. | |
| 2009/0151769 A1 | 6/2009 | Corbin et al. | |
| 2009/0178668 A1 | 7/2009 | Boggavarapu | |
| 2009/0217921 A1 | 9/2009 | Gilon et al. | |
| 2009/0229264 A1 | 9/2009 | Gilon et al. | |
| 2009/0250052 A1 | 10/2009 | Gilon et al. | |
| 2010/0006087 A1 | 1/2010 | Gilon et al. | |
| 2010/0139644 A1 | 6/2010 | Schwarzbach et al. | |
| 2010/0191378 A1 | 7/2010 | Gilon et al. | |
| 2010/0263709 A1 | 10/2010 | Norman et al. | |
| 2010/0282242 A1 | 11/2010 | Gilon et al. | |
| 2010/0300510 A1 | 12/2010 | Goldman et al. | |
| 2011/0036343 A1 | 2/2011 | Kroyzer et al. | |
| 2011/0088396 A1 | 4/2011 | Katz et al. | |
| 2011/0220091 A1 | 9/2011 | Kroyzer | |
| 2012/0024282 A1 | 2/2012 | Gilon et al. | |

FOREIGN PATENT DOCUMENTS

| | | |
|---|---|---|
| WO | WO 2004/004016 | 1/2004 |
| WO | WO 2004/067933 | 8/2004 |
| WO | WO 2007/118223 | 10/2007 |
| WO | WO 2008/092194 | 8/2008 |
| WO | WO 2008/092195 | 8/2008 |
| WO | WO 2008/114248 | 9/2008 |
| WO | WO 2008/118980 | 10/2008 |
| WO | WO 2008/128237 | 10/2008 |
| WO | WO 2008/154599 | 12/2008 |
| WO | WO 2009/015219 | 1/2009 |
| WO | WO 2009/015388 | 1/2009 |
| WO | WO 2009/021099 | 2/2009 |
| WO | WO 2009/055624 | 4/2009 |
| WO | WO 2009/070774 | 6/2009 |
| WO | WO 2009/103077 | 8/2009 |
| WO | WO 2009/131787 | 10/2009 |
| WO | WO 2011/064718 | 6/2011 |
| WO | WO 2011/140021 | 11/2011 |
| WO | WO 2012/014153 | 2/2012 |

OTHER PUBLICATIONS

Cohen et al., "Final Report on the Operation and Maintenance Improvement Project for Concentrating Solar Power Plants," SAND99-1290 [online], Jun. 1999 [retrieved on May 16, 2012]. Retrieved from the Internet: <URL: http://infohouse.p2ric.org/ref/17/16933/1693301.pdf>.

Lopez-Martinez et al., "Vision-based system for the safe operation of a solar power tower plant," *Iberamia*, 2002, LNAI 2527:pp. 943-952.

Meduri et al., "Performance Characterization and Operation of Esolar's Sierra Suntower Power Tower Plant," SolarPACES 2010 Conference, Sep. 21-24, 2010, Perpignan, France.

Mills et al., "Multi-Tower Solar Array Project," *Proceedings of the Solar Harvest Conference, 40th Annual ANZSES Conference*, 2002.

Peterka et al., "Wind Load Reduction for Heliostats," Solar Energy Research Institute, U.S. Department of Energy [online], May 1986 [retrieved on May 16, 2012]. Retrieved from the Internet: <URL: http://www.nrel.gov/docs/legosti/old/2859.pdf>.

Phipps, Gary S., "Heliostat Beam Characterization System Calibration Technique," U.S. Department of Commerce, National Technical Information Service, Sandia Labs, SAND791532C, 1979.

Pottler et al., "Photogrammetry: A Powerful Tool for Geometric Analysis of Solar Concentrators and Their Components," Journal of Solar Energy Engineering, Feb. 2005, 127(1):pp. 94-101.

Roschke, E.J., "Wind Loading on Solar Concentrators: Some General Considerations," Jet Propulsion Laboratory, National Aeronautics and Space Administration, U.S. Department of Energy [online], May 1984 [retrieved May 16, 2012]. Retrieved from the Internet: <URL: http://ntrs.nasa.gov/archive/nasa/casi.ntrs.nasa.gov/19840024844_1984024844.pdf>.

Shortis et al., "Photogrammetric Analysis of Solar Concentrators," Proceedings of the 12th Australian Remote Sensing and Photogrammetry Conference, Fremantle, Australia, 2004, pp. 1-10.

Slack et al., "Esolar Power Tower Performance Modeling and Experimental Validation," SolarPACES 2010 Conference, Sep. 21-24, 2010, Perpignan, France.

Strachan, J.W. and Houser, R.M., "Testing and Evaluation of Large-Area Heliostats for Solar Thermal Applications," Solar Thermal Test Department, Sandia National Laboratories, SAND92-1381, Feb. 1993.

BCB Informatica y Control. Heliostat Calibration for Concentrating Solar Power Plants Using Machine Vision [online]. [retrieved on Nov. 17, 2009]. Retrieved from the Internet: <URL: http://bcb.es/documentos/descargar.php?id=29>.

"Central Receiver Systems" in: Stine, W.B., and Geyer, M., Power from the Sun [online], 2001 [retrieved on Nov. 17, 2009]. Retrieved from the Internet: <URL: http://www.powerfromthesun.net/Chapter10/Chapter10new.htm>, Chapter 10.

Rabl, A., "Tower Reflector for Solar Power Plan," *Solar Energy*, 1976, 18: pp. 269-271.

Stone, K.W., and Jones, S.A., "Analysis of Solar Two Heliostat Tracking Error Sources," Sandia National Laboratories, Report No. SAND99-0239C, Jan. 28, 1999.

Vant-Hull, L.L., and Pitman, C.L., "Static and Dynamic Response of a Heliostat Field to Flux Density Limitations on a Central Receiver," *Solar Engineering*, 1990, pp. 31-38.

* cited by examiner

SOLAR RECEIVER

CROSS-REFERENCE TO RELATED APPLICATIONS

The present application is a 371 National Stage of International Application No. PCT/US08/66597 filed Jun. 11, 2008, which claims the benefit of U.S. Provisional Patent Application No. 60/943,096, entitled "Solar Receiver," filed Jun. 11, 2007, and both of the foregoing applications are hereby incorporated by reference in their entireties.

FIELD OF THE INVENTION

The present invention relates generally to steam generation using solar radiation and, more particularly, to solar receivers for generating steam for use in electric power generation.

SUMMARY OF THE INVENTION

An embodiment of a method for generating steam for a turbine using solar radiation may include (i.e., comprise) supplying feedwater into a feedwater tank of a solar receiver. The solar receiver of a thermal power generating system may include a steam/water separation tank and the feedwater tank. The separation tank may be linked to the feedwater tank by a channel and a solar receiver first section and heat exchanger. The feedwater tank may have (i.e., comprise) a source of preheat other than solar energy. The method may also include determining an amount of preheating to be supplied responsively to a predicted insolation schedule. The method may also include selectively preheating feedwater supplied to the feedwater tank responsively to a result of the determining. The method may also include superheating steam from the separation tank and supplying the steam to the thermal power generating system.

The determining may be such that the amount of preheating supplied to the feedwater is responsive to a length of a predicted cold start period.

Alternatively, the determining may be such that the amount of preheating supplied to the feedwater is responsive to a length of a period of solar energy reception below a minimum threshold.

The superheating may include transferring separated steam from the separation tank to a solar receiver second section to superheat the separated steam. The solar receiver second section may face in a different direction from the solar receiver first section.

An alternative embodiment of a method for generating steam for a turbine using solar radiation may include supplying feedwater into a feedwater tank of a solar receiver. The solar receiver of a thermal power generating system may include a steam/water separation tank and the feedwater tank. The separation tank may be linked to the feedwater tank by a channel and a solar receiver first section and heat exchanger. The feedwater tank may have a source of preheat other than solar energy. The method may also include determining an amount of preheating to be supplied responsively to an electrical energy tariff schedule. The method may also include selectively preheating feedwater supplied to the feedwater tank responsively to a result of the determining. The method may also include superheating steam from the separation tank and supplying the steam to the thermal power generating system.

The selectively preheating may include consuming electricity to heat feedwater during a morning startup.

Alternatively, the selectively preheating may include consuming electricity to heat feedwater only when a differential electricity tariff is equal to or less than a threshold value. The threshold value may include a tariff value corresponding to a low cost diurnal interval for electricity or a minimum tariff value for electricity.

The superheating may include transferring separated steam from the separation tank to a solar receiver second section to superheat the separated steam. The solar receiver second section may face in a different direction from the solar receiver first section.

An embodiment of a method for preheating feedwater input for a solar receiver system, which uses solar radiation incident on a solar receiver to generate superheated steam from the feedwater input, may include providing an auxiliary preheating device in thermal communication with the feedwater input to the solar receiver system and controlling the auxiliary preheating device for heating the feedwater input during selected solar receiver operating periods responsively to at least one of an electrical rate tariff schedule or a predicted insolation rate. The method may further include controlling the auxiliary preheating device so as to use electricity for heating the feedwater input during low cost periods of a differential electricity tariff. Alternatively, the method may further include controlling the auxiliary preheating device during periods of insolation variation to maintain superheated steam output from the solar receiver system.

An embodiment of a solar power system may include a solar receiver. The solar receiver may use solar radiation to generate superheated steam output from a feedwater input. The solar power system may also include an auxiliary preheating device in thermal communication with the feedwater input. The solar power system may also include a controller configured to selectively control the auxiliary preheating device to heat the feedwater input. The controller may selectively control the auxiliary preheating device to heat the feedwater input during cold start periods or after periods of non-use of the solar power system. The controller may also selectively control the auxiliary preheating device based on differential electricity tariffs. The solar power system may further include an array of heliostats for directing solar radiation onto the solar receiver.

The solar receiver may have an integrated preheating/steam generation section and at least one superheating section. The solar power system may further include a forced-recirculation system configured to separate water from steam at an outlet of the integrated preheating/steam generation section. The forced-recirculation system may include a steam separation vessel in fluid communication with the outlet of the integrated preheating/steam generation section, a feedwater vessel in fluid communication with an inlet of the integrated preheating/steam generation section, and a recirculation pump connecting the steam separation vessel to the feedwater vessel. Steam may be separated from water in the steam separation vessel and the separated water may be pumped from the steam separation vessel to the feedwater vessel by the recirculation pump. The auxiliary preheating device may be provided inside the feedwater vessel. Alternatively, the auxiliary preheating device may be provided in a flow path between the feedwater vessel and the inlet of the integrated preheating/steam generation section. The auxiliary preheating device may use electricity or fuel combustion to heat the feedwater input.

Objects, advantages and features of the present invention will become apparent from the following detailed description of the invention when considered in conjunction with the accompanying drawings.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention. Throughout the figures, like reference numerals denote like elements.

DETAILED DESCRIPTION

Generally, a solar power tower system may include a central solar receiver and a set of heliostats which reflect and concentrate sunlight onto the receiver. The central solar receiver uses received solar radiation and converts it to some useful form, such as heat. A central receiver may be located at the top of a receiver tower or at some other location. For example, an intermediate reflector may be used to bounce light received at the top of a tower down to a receiver located at ground level The central solar receiver may include a boiler wherein preheating and steam generation can take place in the same tubes or sets of tubes. By unifying (i.e., integrating) preheating and steam generation in a single boiler section, the unified preheating and steam generation section can occupy less than one-half the circumference of the solar receiver, thereby allowing for more space on the external surface of the receiver for solar heat flux to be used for the superheating function. This may allow superheating to take place at a lower level of solar heat flux per unit of receiver surface area than could otherwise be achieved with separate preheating and steam generation sections.

Prior art boilers for solar receivers typically employ a once-through design. Therefore, the preheating and steam generation functions were necessarily separated into separate sets of tubes to, inter alia, minimize the amount of water in the steam (i.e., achieve phase separation) that left the steam generation tubes and progressed to the superheater. The issue of phase separation can be addressed by employing a forced recirculation design. By employing the forced recirculation design, the preheating and steam generation functions can be integrated into a single boiler section as referenced above and discussed in detail below.

Thus, in an exemplary embodiment, the solar receiver may include a preheating and steam-generation section. A recirculating pump, lower drum, and upper drum may be provided in fluid communication with the preheating and steam-generation section. Heated water may thus be separated from steam in the upper drum and subsequently recirculated by the recirculating pump to the lower drum, where it can be added to feedwater which enters the lower drum through an inlet valve provided for that purpose.

An auxiliary preheater may be provided for preheating feedwater from a cold start. Such a condition may occur, for example, in the morning (e.g., at sunrise) or after any period of nonuse of the solar receiver. The auxiliary preheater can be provided inside the lower drum or in proximity to a separate economizer section. The auxiliary preheater can be electric. The auxiliary preheater may use electricity acquired during a lower cost period of a differential electricity tariff, such as the early morning hours of the day. Alternatively, the auxiliary preheater may use the combustion of a fuel to generate heat for heating the feedwater. A controller may be provided to control operation of the auxiliary preheater. The controller may take into account system operating conditions, such as cold start conditions or variations in insolation level, electricity tariffs or taxes, and operator inputs to automatically control the auxiliary preheater to heat in the feedwater input. The controller may employ an optimization algorithm that takes into account the various inputs and controls the auxiliary preheater to maintain the efficiency, minimize the operating cost of the solar power system, and/or maximize profit of resulting electricity sales.

Figure 1:
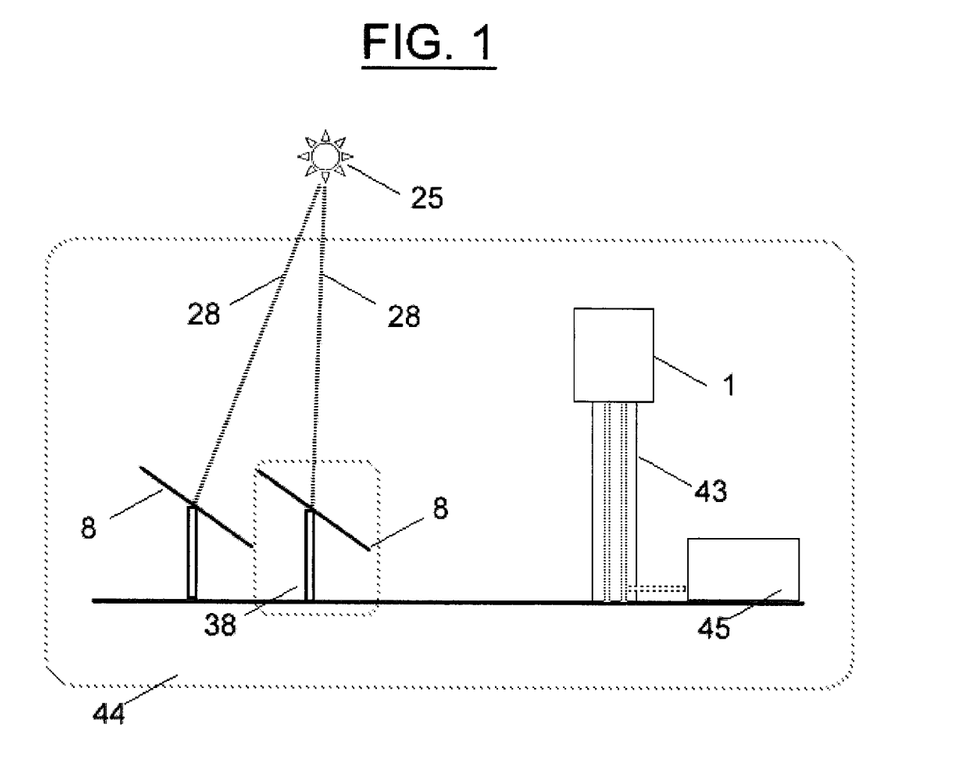
FIG. 1 is a diagrammatic elevation view of a plurality of heliostats and a central power tower.
Figure 2:
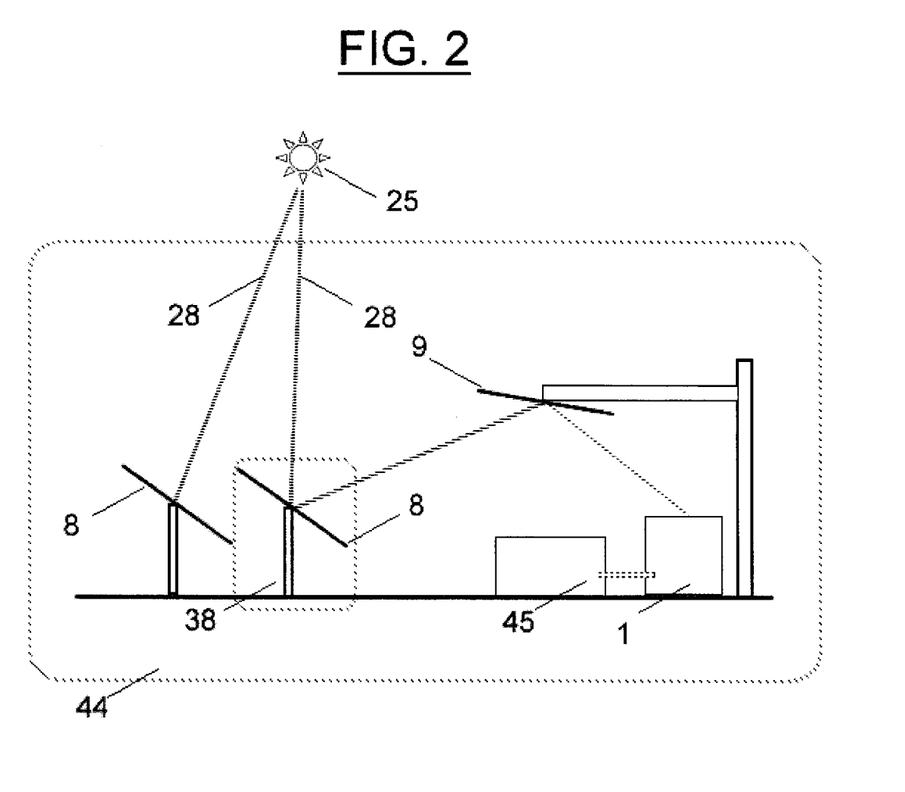
FIG. 2 is a diagrammatic elevation view of a plurality of heliostats, secondary reflector, and solar receiver.

Referring now to the figures and, in particular, to FIG. 1, a solar power system 44 is provided in which heliostats 38 include mirrors 8 that reflect incident solar radiation 28 onto a receiver 1 in which a working fluid (not shown) is heated for later use in an electric power generating plant 15. The heliostat-mounted mirrors 8 are capable of tracking the apparent movement of the sun 25 across the sky each day in order to maintain the reflective focus in the direction of the receiver 1 as the angle of the incident radiation 28 changes. The receiver 1 is located atop a tower 43. In an alternative embodiment, shown in FIG. 2, the solar receiver is located on the ground, and the heliostat-mounted mirrors 8 reflect solar radiation onto one or more suspended mirrors 9 which further reflect the radiation onto the receiver 1.

The solar receiver may include a boiler in which water and steam are pressurized to more than 100 bar and, more preferably, pressurized to more than 140 bar. The receiver also includes conduits, pipelines, or the like, for providing ingress and egress to and from the receiver for water or steam. Superheated steam from the solar receiver may be directed to a steam turbine electric power plant for the production of electricity.

The boiler of the solar receiver includes boiler elements, such as tubes, pipes, conduits and the like, in some of which water is preheated to approximately its boiling point at a given pressure, in some others of which steam is generated from the water, and in yet some others of which the steam is superheated to a higher temperature. While solutions have been proposed in the prior art for interposing superheating tubes with preheating and steam-generating tubes, this solution has not worked well and it has been found to be preferable that superheating be performed either in a separate section of a boiler or in a separate boiler.

Figure 3:
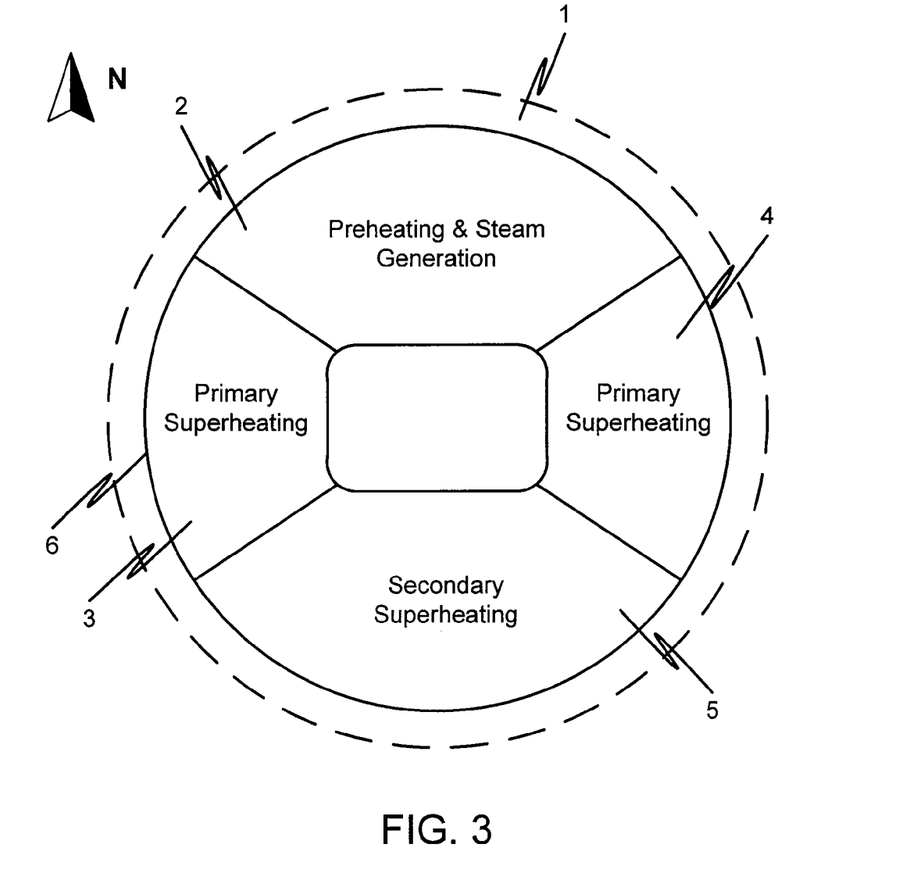
FIG. 3 is a diagrammatic plan view of a solar receiver.

FIG. 3 shows an example of the configuration of a solar receiver 1 which includes a boiler 6 wherein preheating and steam generation both take place in the preheating and steam generation section 2, located on the northern side of the receiver 1. As is known in the art, preheating and steam generation tubes will optimally be on the northern side of the receiver in the northern hemisphere. The sun's position in the southern sky during much of the day yields smaller angles of incidence and reflection of solar radiation for heliostats to the north of a receiver. As a result, lower cosine losses are incurred. Cosine losses occur because the effective reflection area of a heliostat is reduced by the cosine of one-half of the angle between incident radiation and reflected radiation. Because of this more efficient utilization of incident solar radiation, the north-facing side of the receiver will have a generally higher solar heat flux on its external surface than the south-facing side. Boilers are typically designed such that preheating and steam generating sections of a boiler absorb a higher heat flux over the same surface area than the superheating section.

It should be noted that the preheating and steam generating section 2 faces north when the receiver is deployed in a northern hemisphere installation. If the receiver is deployed in a southern hemisphere installation, the orientation of the receiver should be reversed such that the preheating and steam generation section 2 faces south.

According to an exemplary embodiment, the preheating and steam generation section 2 of the boiler takes up no more forty-five percent of the circumference of the solar receiver 1. For example, the preheating and steam generation section 2 may take up an arc of substantially 160 degrees out of the 360 degrees of circumference of the solar receiver.

The superheating function of a solar receiver may be performed in a primary superheater section and in a secondary superheater section. Pressurized steam may be heated to a first temperature in the primary superheater section and then to a second temperature in the secondary superheater section. For example, steam at 140 bar or more is superheated to between 450 and 490 degrees Celsius in a primary superheater, and is further superheated to between 540 and 560 degrees Celsius in a secondary superheater. Referring again to FIG. 3, a primary superheating section may be divided into a first primary superheating subsection 3 and a second primary superheating subsection 4, located approximately to the southwest and southeast, respectively, of the preheating and steam generating section 2.

When the solar receiver is deployed in a northern hemisphere installation, the first primary superheating section 3 on the western side of the solar receiver performs the primary superheating function more effectively in the morning hours while the second primary superheating section 4 on the eastern side of the solar receiver performs the primary superheating function more effectively in the afternoon hours. This is due to the position of the sun in the sky and the respective incidence and reflection angles and resulting cosine losses, similar to the discussion above regarding the differences between north and south orientation. Steam from the steam generation tubes may be superheated in either one of the primary superheating sections. Alternatively, steam from the steam generation tubes may be superheated in both of primary superheating sections in series. The secondary superheating section 5 may be located on the southern side of the receiver 1, as shown in FIG. 3. Solar heat flux on the external surface of the solar receiver corresponding to the primary superheating subsections may be substantially in the range 130 to 230 kilowatt (kW) per square meter (sqm) during full solar operation. Solar heat flux on the external surface of the solar receiver corresponding to the secondary superheating section may be substantially in the range 100 to 130 kW/sqm during full solar operation. For example, the solar heat flux in each superheating section may be substantially 130 kW/sqm.

In an alternative embodiment, at least part of the superheating may be performed in a different solar receiver and steam may be transported to the other receiver by a pipeline or conduit. For example, steam may be generated and superheated to a first temperature of less than 490 degrees Celsius in one receiver, and further superheated in another receiver to a second temperature of 540 to 560 degrees Celsius. The limit of 490 degrees Celsius stems from the step function of the cost of transporting pressurized steam in pipelines with respect to temperature. In another example, steam may be generated at a first temperature between 300 and 350 degrees Celsius in one receiver, and then superheated in another receiver to a second temperature of 540 to 560 degrees Celsius.

Figure 4:
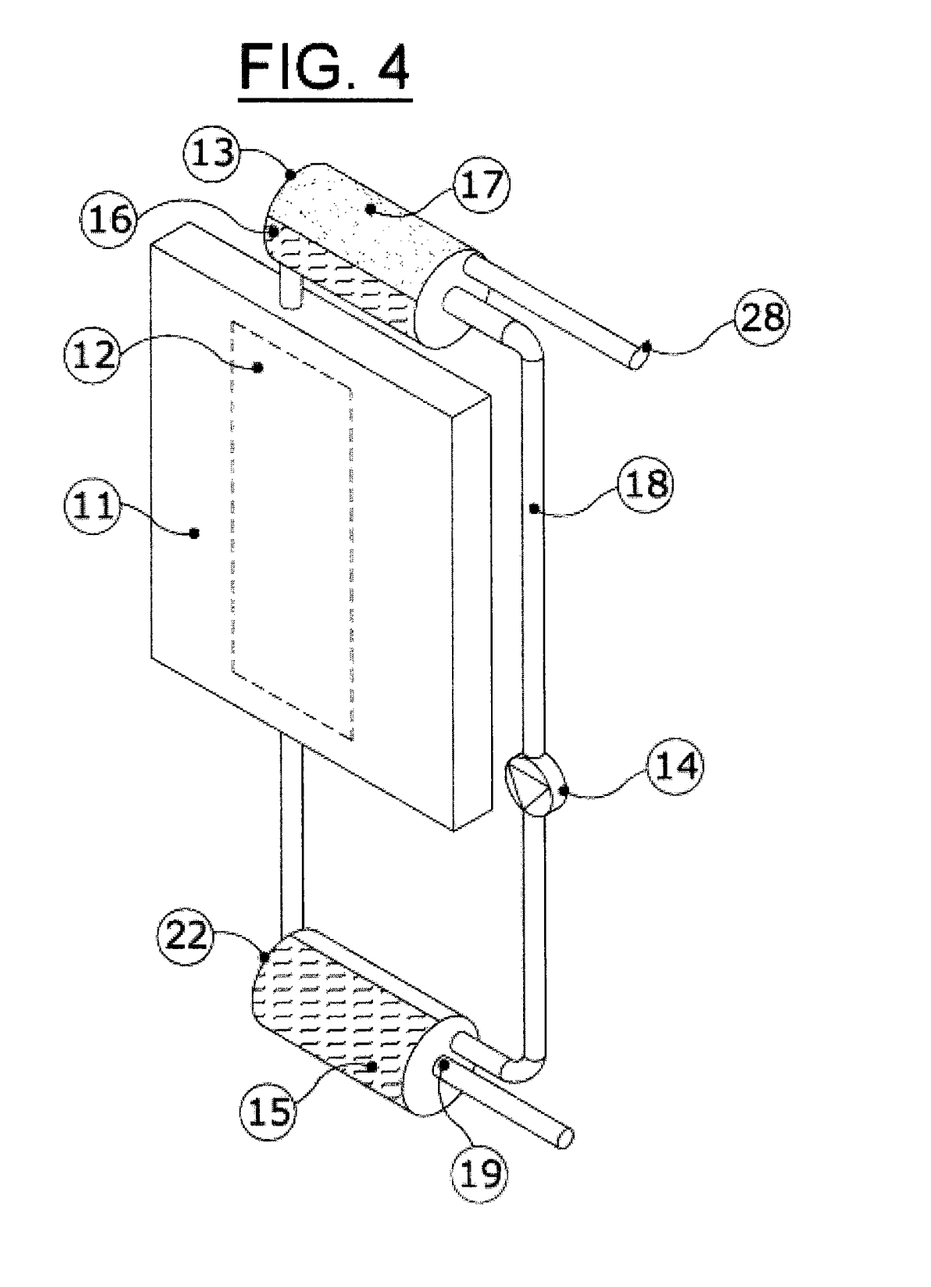
FIG. 4 shows components of a forced recirculation solar boiler.

Referring now to FIG. 4, a forced-recirculation boiler 11 includes preheating and steam generation tubes 12 (not shown) which are in fluid communication with a feedwater drum 22 (i.e., lower drum), a steam separation drum 13 (i.e., upper drum), a water recirculation pipe 18 and a recirculating pump 14. Feedwater 15 enters the feedwater drum 22 through an inlet valve 19 which may be computer-controlled. Alternatively, the inlet valve 19 may open and close on the basis of the difference in pressure on the two sides of the valve. In another alternative, the inlet valve 19 may be manually opened and closed. The feedwater 15 passes through the preheating and steam generation tubes 12 where solar energy is absorbed in the fluid as heat. From there the fluid reaches steam separation drum 13 where steam 17 leaves the drum through pipe 28 leading to the superheating section. Residual water 16 is removed through recirculation pipe 18 by recirculation pump 14 to feedwater drum 22 where it can be added to feedwater 15.

Figure 5:
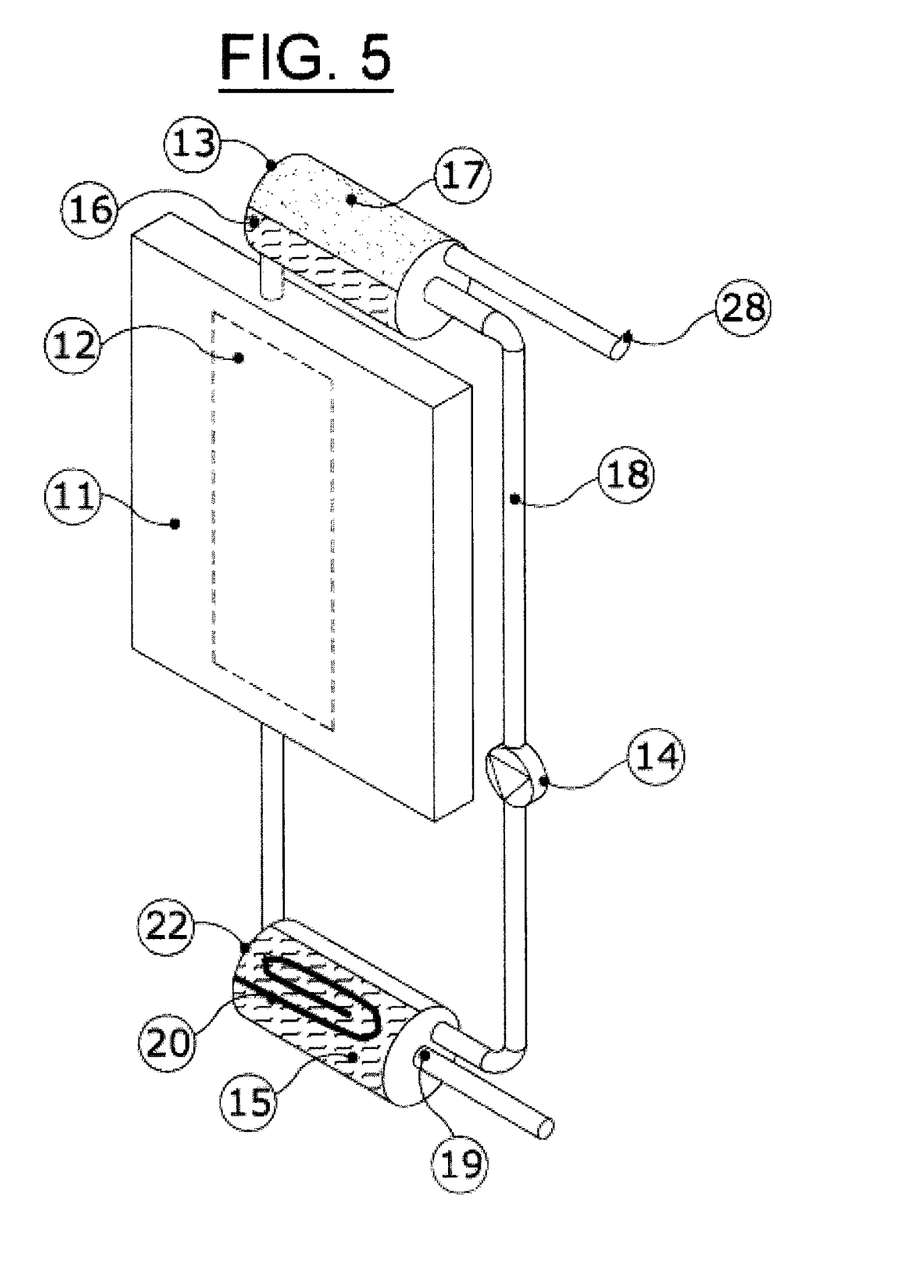
FIG. 5 shows the components of the forced recirculation solar boiler of FIG. 4 in conjunction with an auxiliary preheater.
Figure 6:
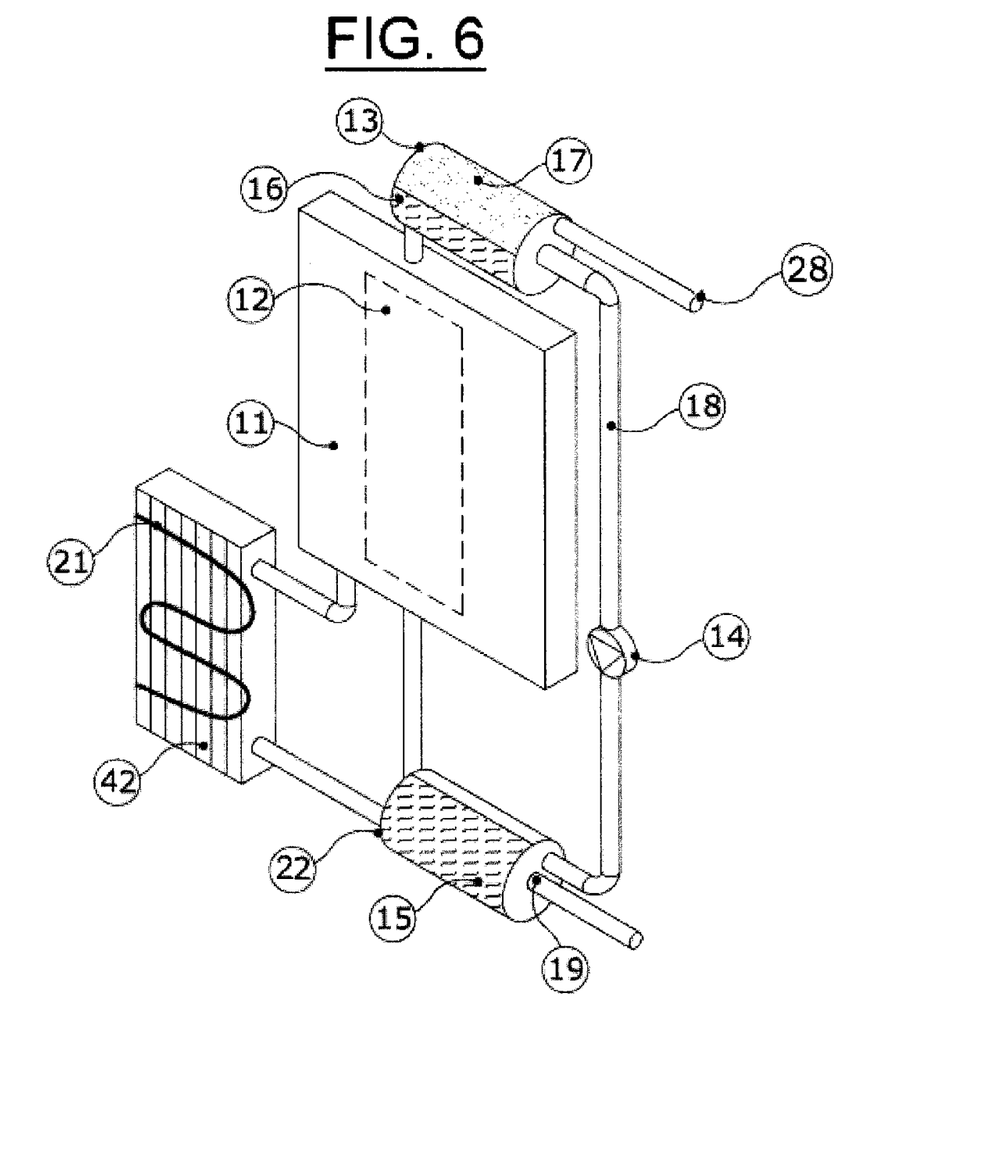
FIG. 6 shows the components of the forced recirculation solar boiler of FIG. 4 in conjunction with a separate economizer and auxiliary preheater.

FIG. 5 shows, as an example, an electric auxiliary preheater 20 provided inside the feedwater drum 22. FIG. 6 shows, as another example, an electric auxiliary preheater 21 provided in proximity to an economizer section 42 in fluid communication between feedwater drum 22 and preheating and steam generation tubes 12. Although shown in the flowpath between feedwater drum 22 and preheating and steam-generation tubes 12 in FIG. 6, economizer section 42 with preheater 21 may be located upstream of feedwater drum 22.

In an alternative embodiment, a solar receiver may include two boiler sections, in one of which are provided preheating and steam generation tubes and in the other of which are provided superheating tubes. Superheating tubes are of greater diameter than preheating/steam generation tubes because of the lower density of steam at sub-critical pressures. For example, preheating and steam generation can be one-half inch in diameter while in the same receiver superheating tubes are one inch in diameter.

Alternatively, a solar receiver may include two boilers. In a first boiler, boiler elements may be provided for preheating pressurized water to approximately its boiling point at a given pressure and for generating steam from the preheated water. In a second boiler, boiler elements may be provided for superheating the pressurized steam to a higher temperature. The first boiler may also include boiler elements in which a primary superheating function is performed while the second boiler may include provided elements in which a secondary superheating function is performed.

Figure 7:
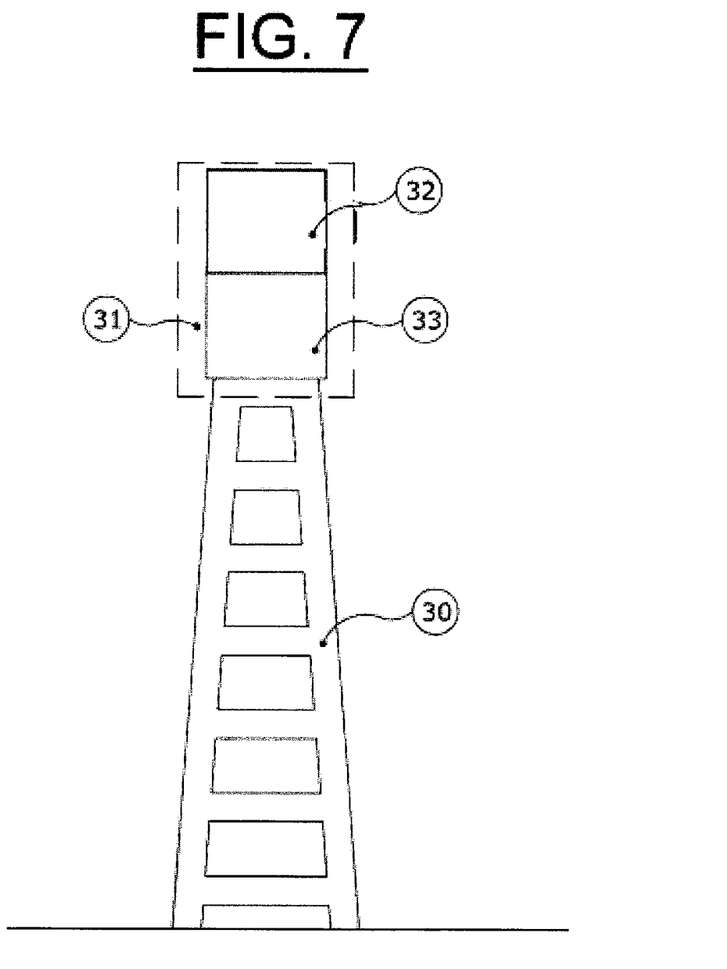
FIG. 7 is a diagrammatic elevation view of a solar power tower and solar receiver.

The more steam is superheated, the more costly its transport in pipelines and the like because of pipeline dimensions and materials required for the higher temperatures, and so whenever possible it is preferable that transport of higher temperature steam be over shorter distances than lower temperature steam. This can be accomplished by superheating steam, or performing a secondary superheating function, lower on a solar tower than where the steam is generated or is superheated in a primary superheater. Thus, a first boiler or boiler section may be provided for preheating and steam generation is positioned higher on a solar power tower than a second boiler or boiler section provided for superheating steam. For example, FIG. 7 shows a tower 30 atop which is provided a receiver 31. The receiver 31 includes a first boiler 32 in which boiler elements (not shown) are provided for preheating and steam generation, and further includes a second boiler 33 in which boiler elements (also not shown) are provided for superheating of steam.

Minimizing the transport distance of the highest temperature superheated steam can also be accomplished by performing at least the secondary superheating function in a solar receiver located in proximity to a steam turbine electric generation plant. This is particularly effective in a solar power tower system which includes more multiple receivers on distributed towers, because then only steam at a lower temperature is transported the longer distance from the various receivers to the superheating receiver which is located in proximity to the steam turbine. The lower temperature can be between 300 and 350 degrees Celsius if no superheating is done at the various receivers, or at another temperature lower than 490 degrees Celsius if primary superheating is performed at the various receivers.

Figure 8:
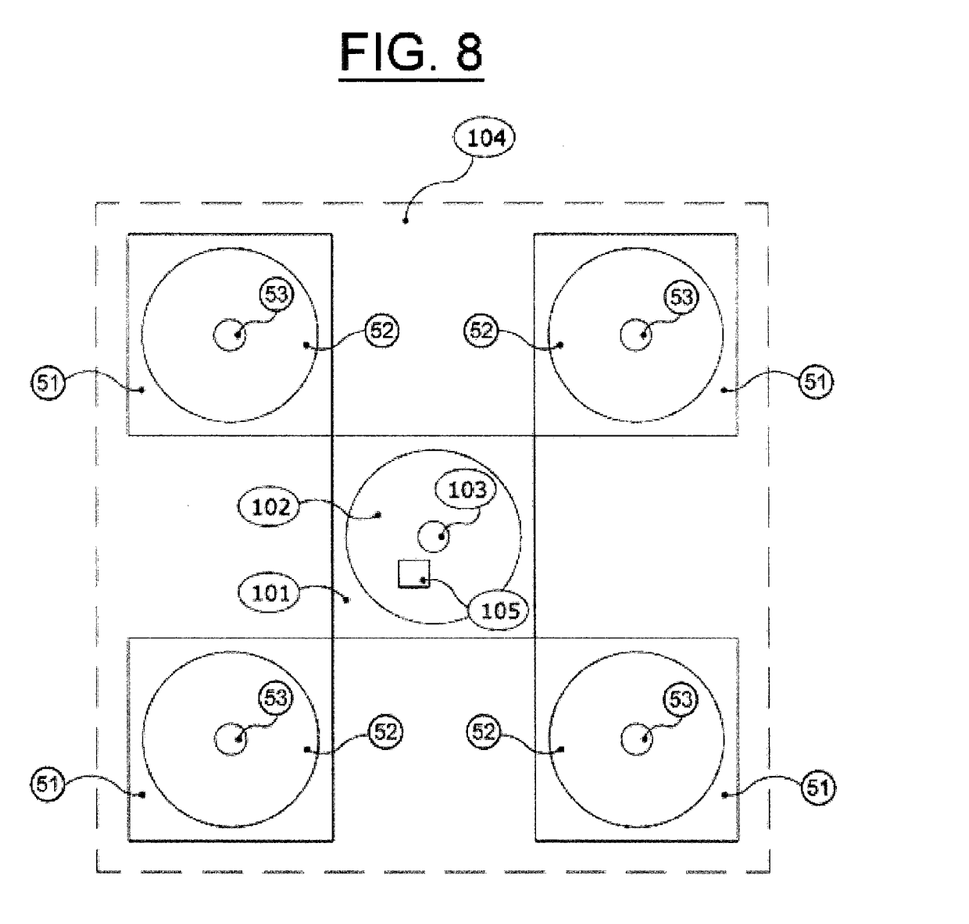
FIG. 8 is a diagrammatic view of a system of multiple solar towers.

For example, FIG. 8 shows a solar system 104 having a plurality of solar fields 51 in each of which are located heliostat fields 52 and receivers 53. In each receiver 53, water may be preheated and steam may be generated. Steam may also be optionally superheated in a primary superheater section of each receiver. Another receiver 103 may be provided, to which steam generated (and optionally partly superheated) at the other receivers 53 is transported via pipelines, conduits or similar, and in which that steam is further superheated. Receiver 103 may be located in an additional solar field 101 that includes a heliostat field 102. Alternatively, the heliostat fields 52 in the other solar fields 51 are capable of reflecting solar radiation also onto the superheating receiver 103 so as to obviate the need for heliostat field 102. A steam turbine electric plant 105 is provided in proximity to the superheating tower 103 in order to minimize transport distance of steam at high temperatures (e.g., temperatures between 540 and 560 degrees Celsius). The superheating receiver 103 may also include a boiler in which solar radiation is used to heat steam in a turbine reheat cycle.

In accordance with another embodiment of the invention, there is provided a method for preheating water in a solar receiver which includes a boiler, wherein an auxiliary preheater is provided for preheating feedwater from a cold start. In one aspect the method may include using an electric preheater. In another aspect, the method may include operating an auxiliary preheater by combusting a fuel. The auxiliary preheater may be provided inside a lower drum that is in fluid connection with at least a section of the boiler. Alternatively, the auxiliary preheater is provided in or in proximity to an economizer section interposed between a lower drum and at least a section of the solar receiver. The method may also include acquiring electricity during a lower cost period of a differential electricity tariff and using that electricity to preheat feedwater from a cold start during a morning startup.

An embodiment of a method for generating steam for a turbine electric power plant using solar radiation may include directing solar radiation onto a solar receiver having a boiler. A first section of the boiler may receive feedwater input. The first section may be arranged to heat the feedwater input to generate steam using the directed solar radiation. The method may include flowing feedwater through a feedwater drum to serve as feedwater input to an inlet of the first section of the boiler. The method may also include separating water from steam in a steam separation drum, which is in fluid communication with an outlet of the first section of the boiler. The method may also include pumping the separated water from the steam separation drum to the feedwater drum and combining the separated water with the flowing feedwater in the feedwater drum. The method may also include selectively preheating the feedwater input in response to system operating conditions. The system operating conditions include a cold start period and a period of non-use. Selectively preheating may include acquiring electricity during a period when a differential electricity tariff is equal to or less than a threshold value and using the acquired electricity to power an auxiliary preheating device to heat the feedwater input from a cold start during a morning startup. The threshold value may correspond to a low cost diurnal interval for electricity or a minimum tariff value for electricity.

The method may also include transferring separated steam from the steam separation drum to a second section of the boiler, wherein the second section of the boiler is arranged to superheat the separated steam. Alternatively, the method may include transferring separated steam from the steam separation drum to a second section of the boiler, which is arranged to superheat the separated steam to a first temperature, and transferring the superheated steam from the second section of the boiler to a third section of the boiler, which is arranged to further superheat the superheated steam to a second temperature higher than said first temperature.

Figure 9:
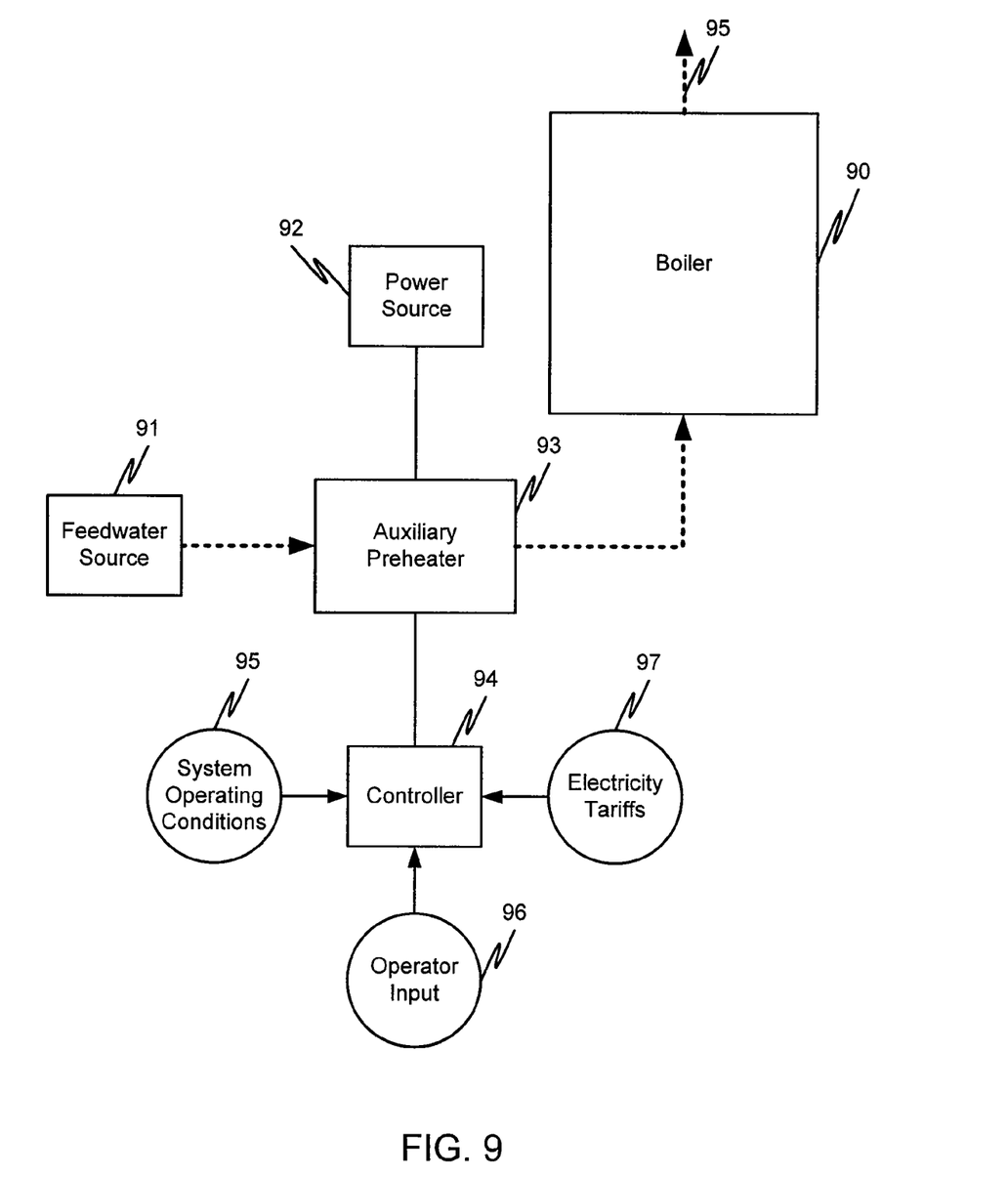
FIG. 9 is a diagrammatic view of a solar boiler and auxiliary heater.

FIG. 9 shows a block diagram schematic of a boiler 90 of a solar receiver with an auxiliary preheating device 93. Boiler 90 uses incident solar radiation to convert a feedwater input into steam output 95. As discussed above, the auxiliary preheating device 93 may be provided in a flowpath between a feedwater source 91 and the boiler 90, so as to allow the auxiliary preheating device 93 to heat a feedwater input. Feedwater source 91 may include the feedwater drum 22, as illustrated in FIGS. 5 and 6, or another feedwater source. Auxiliary preheating device 93 uses energy from power source 92 to heat the feedwater input. Note that the power source may be an electric power source, such as the electric power grid. Alternatively, power source 92 may be a combustion source which provides heat for use in the auxiliary preheating device 93. Auxiliary preheating device 93 may be controlled by a controller 94. The controller 94 may a variety of inputs for use in controlling the auxiliary preheating device 93. For example, controller 94 may receive inputs regarding system operating conditions 95 and electricity tariffs 97. Controller 94 may also be configured to receive inputs directly from an operator 96. The controller 94 may take into account any or all of the inputs in controlling the heating function of the auxiliary preheating device 93. Further, the controller 94 may employ an optimization algorithm that takes into account any or all of the various inputs to control the auxiliary preheating device. For example, the controller may seek to optimize efficiency of the system, minimize operating costs, and/or maximize profits by judicious control of the heating function of the auxiliary preheating device 93.

For example, a solar receiver may use an electric auxiliary preheating device for preheating a feedwater input. The electric auxiliary preheating device may be controlled by a controller, which receives information regarding a plurality of variables, including, but not limited to, weather, time of day, electricity tariffs, measured insolation conditions, and system conditions. System conditions may include operating conditions of the working fluid, such as steam output temperature. The variable information may be received by the controller in real-time, so as to enable continuous updating of an activation status of the electric auxiliary preheating device in response to changing conditions.

The controller may use the variable information, alone or in combination, to determine if the electric auxiliary preheating device should be activated and/or the degree of activation. For example, the controller may provide a "go" or "no go" determination for the auxiliary preheating device based on analysis of the received variable information. For instance, the controller may provide a "go" determination for activating the electric auxiliary preheating device if the tariff information is below a set threshold and a "no go" determination if the tariff information is above the set threshold. The set threshold for the tariff information may correspond to a low cost diurnal interval for electricity or a minimum tariff value for electricity. In addition, the controller may provide a "go" determination if the steam output temperature drops below a set threshold and "no go" determination if the steam output temperature is above the set threshold. Similarly, the controller may provide a "go" determination if the measured insolation drops below a certain threshold value and a "no go" determination if the measured insolation is above the certain threshold value.

The controller may also use the weather and time of day to provide information regarding expected changes in insolation. If the weather and/or time of day predict a sharp increase in the insolation, then the controller may be configured to provide a "go" determination for activating the electric auxiliary preheating device. Such a condition may occur when bright sunshine follows passing clouds or during morning startup (i.e., sunrise). If the weather and/or time of day predict a gradual increase in the insolation, then the controller may be configured to provide a "no go" determination or a delayed "go" determination. In such a scenario, the activation of the preheating device may be delayed until a threshold temperature of the working fluid in the solar receiver is reached.

The controller may also optimally account for multiple variables simultaneously in determining the activation state of the preheating device. For example, if most of the received variable information suggests a "go" determination, the controller may activate the electric auxiliary preheating device. If most of the received information suggest a "no go" determination, the controller may not activate the electric auxiliary preheating device. The controller may also preferentially weight certain variables. For example, the controller may weight the tariff variable, such that the electric auxiliary preheating device will not be activated unless the tariff is below a threshold value. In another example, the controller may preferentially weight the time of day variable, such that the electric auxiliary preheating device is only activated during times of a predicted sharp increase in insolation.

In an alternative embodiment, the auxiliary preheating device for preheating a feedwater input may use stored thermal energy. Thermal energy generated by the solar receiver may be saved in a thermal energy storage system for later use by the auxiliary preheating device. For example, a thermal energy storage system using a molten salt mixture of 60% sodium nitrate and 40% potassium nitrate may be used. The molten salt effectively may retain thermal energy over an extended period of time when stored in a well insulated hot storage tank. The thermal energy stored in the molten salt may then be retrieved by the auxiliary preheating device to preheat the input feedwater.

During times of peak insolation, heat may be generated in the solar receiver in excess of what is needed to generate superheated steam. This excess heat may be supplied to the thermal energy storage system for storage in the molten salt. Low grade heat may also be stored in the molten salt of the thermal energy storage system. For example, periods may occur when insolation is insufficient to generate superheated steam. This may occur at the end of the day (i.e., around sunset) or in lowlight conditions (e.g., partially overcast conditions). As the insolation is insufficient to generate the superheated steam necessary for electric power generation, the controller may direct the heat generated in the solar receiver to the thermal energy storage system to store for later use. This stored heat can then be used by the preheating device for a quick startup when sufficient insolation levels return, such as the next morning or when lowlight conditions desist.

Similar to the electric auxiliary preheating device described above, the thermal storage preheating device may be controlled by a controller. The controller may receive information regarding a plurality of variables, including, but not limited to, weather, time of day, time of year, temperature of stored molten salt, measured insolation conditions, and solar receiver conditions, such as steam output temperature. The controller may receive such information in real-time and use the information to continuously update an activation status of the auxiliary preheating device.

The controller may use the variable information, alone or in combination, to determine if the auxiliary preheating device should be activated, similar to the electric auxiliary preheating device described above. For example, the controller may provide a "no go" determination if the temperature of the stored molten salt is below a set threshold and "go" determination if the temperature of the stored molten salt is above the set threshold. The controller may also optimize activation of the preheating device taking into account multiple variables at the same time. For example, if most of the received information suggests a "go" determination, the controller may activate the auxiliary preheating device. The controller may also preferentially weight certain variables. For example, the controller may weight the temperature of stored molten salt variable, such that the auxiliary preheating device will not be activated unless the temperature of stored molten salt is above a threshold value. In another example, the controller may preferentially weight the time of day variable, such that the auxiliary preheating device is only activated during times of a predicted sharp increase in insolation.

Certain features of this invention may sometimes be used to advantage without a corresponding use of the other features. While specific embodiments of the invention have been shown and described in detail to illustrate the application of the principles of the invention, it will be understood that the invention may be embodied otherwise without departing from such principles.

Embodiments of the method according to this invention may be implemented, in whole or in part, on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any process capable of implementing the functions or steps described herein can be used to implement embodiments of the invention.

Furthermore, embodiments of the system and method according to this invention may be readily implemented, fully or partially, in software using, for example, object or object-oriented software development environments that provide portable source code that can be used on a variety of computer platforms. Alternatively, embodiments of the disclosed system and method according to this invention can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the system and method according to this invention can be implemented in hardware and/or software using any known or later developed systems or structures, devices and/or software by those of ordinary skill in the applicable arts from the function description provided herein and with a general basic knowledge of the computer arts, solar boiler technology, and control systems.

Moreover, embodiments of the system and method according to this invention can be implemented in software executed on a programmed general purpose computer, a special purpose computer, a microprocessor, or the like. Also, embodiments of the system and method according to this invention can be implemented as a program embedded on a personal computer such as a JAVA® or CGI script, as a resource residing on a server or image processing workstation, as a routine embedded in a dedicated processing system, or the like. The method and system can also be implemented by physically incorporating the control method into a software and/or hardware system, such as the hardware and software systems of the solar receiver.

It is, therefore, apparent that there is provided, in accordance with the present invention, a system and method for generating steam using a solar receiver. While this invention has been described in conjunction with a number of embodiments, it is evident that many alternatives, modifications and variations would be or are apparent to those of ordinary skill in the applicable arts. Accordingly, Applicants intend to embrace all such alternatives, modifications, equivalents and variations that are within the spirit and scope of this invention.

What is claimed is:

1. A method for generating steam for a turbine using solar radiation, comprising:
   in a solar receiver of a thermal power generating system, the receiver having a steam/water separation tank and a feedwater tank, the separation tank being linked to the feedwater tank by a channel and by a solar receiver first section, the feedwater tank having a source of preheat other than solar energy, supplying feedwater into the feedwater tank;
   determining an amount of preheating to be supplied responsively to a predicted insolation schedule;
   selectively preheating the feedwater in or from the feedwater tank responsively to a result of the determining;
   conveying the preheated feedwater to the solar receiver first section;
   using solar radiation incident on the solar receiver first section, further heating the preheated feedwater to generate steam;
   conveying the generated steam to the steam/water separation tank and separating the generated steam from water therein;
   using solar radiation incident on the solar receiver, superheating the separated steam from the steam/water separation tank; and
   supplying the superheated steam to the thermal power generating system.

2. The method of claim 1, wherein the determining is such that the amount of preheating supplied to the feedwater is responsive to a length of a predicted cold start period.

3. The method of claim 1, wherein the determining is such that the amount of preheating supplied to the feedwater is responsive to a length of a period of solar energy reception below a minimum threshold.

4. The method of claim 1, wherein the superheating includes using solar radiation incident on a second section of the solar receiver to superheat the separated steam, the solar receiver second section facing in a different direction from the solar receiver first section.

5. A method for generating steam for a turbine using solar radiation, comprising:
   in a solar receiver of a thermal power generating system, the receiver having a steam/water separation tank and a feedwater tank, the separation tank being linked to the feedwater tank by a channel and by a solar receiver first section, the feedwater tank having a source of preheat other than solar energy, supplying feedwater into the feedwater tank;
   determining an amount of preheating to be supplied responsively to an electrical energy tariff schedule;
   selectively preheating the feedwater in or from the feedwater tank responsively to a result of the determining;
   conveying the preheated feedwater to the solar receiver first section;
   using solar radiation incident on the solar receiver first section, further heating the preheated feedwater to generate steam;
   conveying the generated steam to the steam/water separation tank and separating the generated steam from water therein;
   using solar radiation incident on the solar receiver, superheating the separated steam from the steam/water separation tank; and
   supplying the superheated steam to the thermal power generating system.

6. The method of claim 5, wherein the selectively preheating includes consuming electricity to heat feedwater during a morning startup.

7. The method of claim 5, wherein the selectively preheating includes consuming electricity to heat feedwater only when a differential electricity tariff is equal to or less than a threshold value.

8. The method of claim 5, wherein the superheating includes using solar radiation incident on a second section of the solar receiver to superheat the separated steam, the solar receiver second section facing in a different direction from the solar receiver first section.

9. The method of claim 7, wherein said threshold value includes a tariff value corresponding to a low cost diurnal interval for electricity or a minimum tariff value for electricity.

* * * * *